United States Patent
Kim et al.

(10) Patent No.: US 11,965,110 B2
(45) Date of Patent: Apr. 23, 2024

(54) POLYIMIDE VARNISH COMPOSITION FOR FLEXIBLE SUBSTRATE AND POLYIMIDE FILM USING SAME

(71) Applicant: NexFlex Co., Ltd., Chungcheongbuk-do (KR)

(72) Inventors: So Jeong Kim, Daejeon (KR); Joo Young Kim, Sejong-si (KR); Hyuk Jun Kim, Daejeon (KR)

(73) Assignee: NEXFLEX CO., LTD., Chungcheongbuk-Do (KR)

( * ) Notice: Subject to any disclaimer, the term of this patent is extended or adjusted under 35 U.S.C. 154(b) by 0 days.

(21) Appl. No.: 17/646,070

(22) Filed: Dec. 27, 2021

(65) Prior Publication Data

US 2022/0220337 A1  Jul. 14, 2022

(30) Foreign Application Priority Data

Jan. 11, 2021  (KR) .......................... 10-2021-0003092

(51) Int. Cl.
| | | |
|---|---|---|
| *C08G 73/10* | (2006.01) | |
| *B29C 41/00* | (2006.01) | |
| *B29C 41/42* | (2006.01) | |
| *C09D 179/08* | (2006.01) | |
| *B29K 79/00* | (2006.01) | |
| *B29L 7/00* | (2006.01) | |
| *B29L 31/34* | (2006.01) | |

(52) U.S. Cl.
CPC .......... *C09D 179/08* (2013.01); *B29C 41/003* (2013.01); *B29C 41/42* (2013.01); *B29K 2079/08* (2013.01); *B29L 2007/008* (2013.01); *B29L 2031/34* (2013.01)

(58) Field of Classification Search
CPC ............ C08G 73/1085; C08G 73/1042; C08J 2379/08; C08J 5/18
See application file for complete search history.

(56) References Cited

U.S. PATENT DOCUMENTS

2020/0407593 A1* 12/2020 Miura .................... C03C 17/32

FOREIGN PATENT DOCUMENTS

| CN | 109021234 | * | 12/2018 |
|---|---|---|---|
| JP | H0656992 | * | 3/1994 |
| JP | 2017141380 A | | 8/2017 |
| JP | 2018028053 A | | 2/2018 |
| JP | WO 2019131884 | * | 7/2019 |
| JP | 2020203479 A | | 12/2020 |
| KR | 10-2016-0067413 A | | 6/2016 |
| KR | 10-2019-0003328 A | | 1/2019 |
| KR | 20190004941 | * | 1/2019 |
| KR | 10-2020-0021264 A | | 2/2020 |
| KR | 10-2020-0093700 A | | 8/2020 |
| WO | 2006109753 A1 | | 10/2006 |
| WO | 2020/040356 A1 | | 2/2020 |
| WO | 2022085398 A1 | | 4/2022 |

* cited by examiner

*Primary Examiner* — Gregory Listvoyb
(74) *Attorney, Agent, or Firm* — Heslin Rothenberg Farley & Mesiti P.C.

(57) ABSTRACT

The present disclosure relates to a polyimide varnish composition for a flexible substrate and a polyimide film using the same, and a polyimide varnish composition for a flexible substrate according to the present disclosure may include an acid anhydride including 3,3',4,4'-biphenyltetracarboxylic dianhydride (BPDA) and pyromellitic dianhydride (PMDA), and a diamine. The polyimide varnish composition according to the present disclosure has the advantage of being able to manufacture a polyimide film having heat resistance, high flexural properties, and high flexibility by increasing elongation while having a low coefficient of thermal expansion.

2 Claims, 1 Drawing Sheet

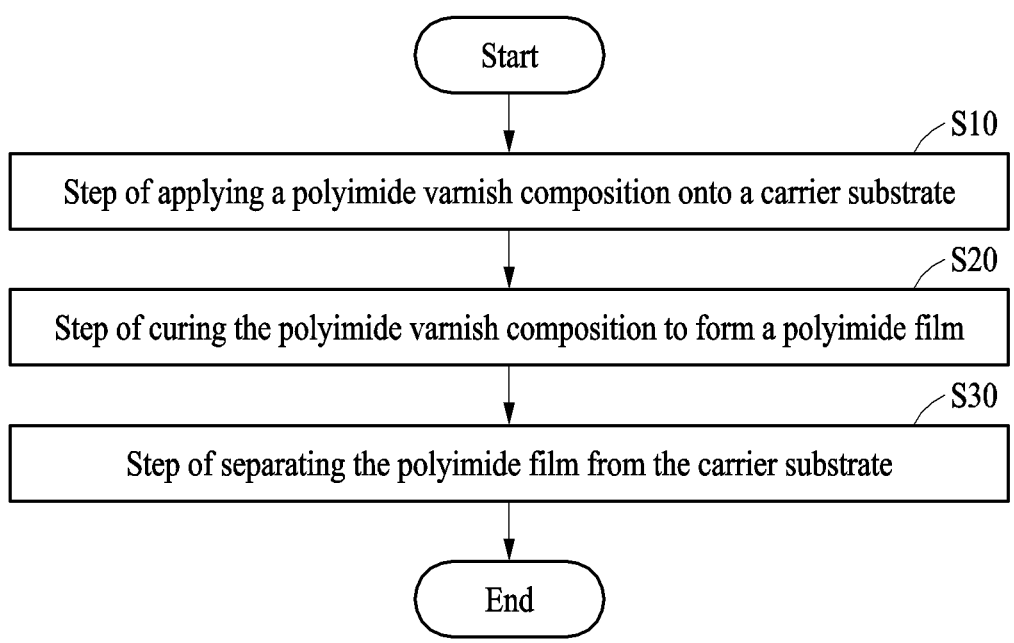

POLYIMIDE VARNISH COMPOSITION FOR FLEXIBLE SUBSTRATE AND POLYIMIDE FILM USING SAME

CROSS-REFERENCE TO RELATED APPLICATIONS

This application claims the benefit of Korean Patent Application No. 10-2021-0003092 filed on Jan. 11, 2021, in the Korean Intellectual Property Office, the entire disclosure of which is incorporated herein by reference for all purposes.

BACKGROUND

1. Field of the Invention

One or more example embodiments relate to a polyimide varnish composition for a flexible substrate and a polyimide film using the same.

2. Description of the Related Art

In general, polyimide (PI) is diversely used in fields requiring strong organic materials such as high-temperature fuel cells, displays, or military purpose uses, since it has high heat resistance as a polymer of an imide monomer. The polyimide film is a film made of polyimide resin, and with the miniaturization and high integration of electronic devices, polyimide in the form of a film has become a material that is in the spotlight.

Unlike a polyimide film sold in the form of a sheet or a roll after being subjected to molding in a production line, polyimide varnish is a material which is supplied in a liquid form and subjected to final molding at each application. Currently, polyimide varnish is a core material requiring high heat resistance and insulation properties, and its uses such as glass replacement use for display panel substrates, passivation (insulation) use for semiconductors, insulation coating use for electric vehicle motors, separator (insulation) use for secondary batteries, etc. are rapidly expanding. Polyimide varnish has advantages in that it maintains a foreign material level close to zero (defect free), has little deformation even under repeated heat and chemical and physical external forces, and has excellent electrical insulation and shielding functions.

Since a flexible device is accompanied by a high-temperature process, heat resistance at high temperatures is required. Since the process is performed at a very high temperature, it is necessary to manufacture a polyimide film having high heat resistance, and it is required to have properties of excellent flexural properties and flexibility without significant thermal expansion.

The above-mentioned background art has been possessed or acquired by the inventor in the process of deriving the disclosure content of the present application, and it cannot necessarily be said to be a known technology disclosed to the general public prior to the present application.

SUMMARY

In order to solve the aforementioned problems, example embodiments provide a polyimide varnish composition for a flexible substrate having high heat resistance.

Specifically, a polyimide varnish composition for a flexible substrate according to the present disclosure is intended to manufacture a polyimide film with reduced coefficient of thermal expansion and improved elongation.

However, the tasks to be solved by the present disclosure are not limited to those mentioned above, and other tasks not mentioned will be clearly understood by those skilled in the art from the following description.

According to an aspect, there is provided a polyimide varnish composition for a flexible substrate, the polyimide varnish composition may include: an acid anhydride including 3,3',4,4'-biphenyltetracarboxylic dianhydride (BPDA) and pyromellitic dianhydride (PMDA); and a diamine.

According to an example embodiment, BPDA and PMDA may have a molar ratio of 1:9 to 3:7.

According to an example embodiment, the diamine may include p-phenylenediamine (PDA) and 2-(4-aminophenyl)benzoxazole-5-amine (APBOA).

According to an example embodiment, PDA and APBOA may have a molar ratio of 7:3 to 9:1.

The polyimide varnish composition for the flexible substrate according to an aspect may further include an imidazole-based curing catalyst.

According to an example embodiment, the curing catalyst may include at least one selected from the group consisting of 2,4,5-triphenylimidazole, 1,2,4,5-tetramethylimidazole, 2-ethyl-4-methylimidazole, 2,4,5-trimethylimidazole, 2-phenyleneimidazole, 4-phenyleneimidazole, 4,5-diphenylimidazole, 1-benzylimidazole, 2-phenylimidazoline, and thiabendazole.

According to an example embodiment, the curing catalyst may be contained in an amount of 5 mol % to 50 mol % based on the total mole number of the acid anhydride and diamine.

According to an example embodiment, the curing catalyst may have a boiling point of 250° C. or more and a pKa of 6.0 or more.

According to other aspects of the present disclosure, there is provided a polyimide film which may be manufactured from the polyimide varnish composition for the flexible substrate according to an aspect.

According to an example embodiment, the polyimide film may have a coefficient of thermal expansion of 8 ppm/K or less at 50° C. to 450° C., a glass transition temperature of 450° C. or more, a thermal degradation temperature of 550° C. or more, an elastic modulus of 6 GPa or more, a transmittance for light having a wavelength of 550 nm of 65% or more, an elongation at a crosshead speed of 20 mm/min of 15% or more, or an isothermal heat resistance time at 480° C. of 2 hours or more.

According to an example embodiment, the polyimide film may have a haze of 1 or less. According to another aspect of the present disclosure, there is provided a method for manufacturing a flexible electronic device, wherein the method may include the steps of: applying the polyimide varnish composition for the flexible substrate according to an aspect onto a carrier substrate; curing the polyimide varnish composition to form a polyimide film; forming an electronic device on the polyimide film; and separating the polyimide film from the carrier substrate.

According to an example embodiment, the separation step may be performed by laser irradiation.

Additional aspects of example embodiments will be set forth in part in the description which follows and, in part, will be apparent from the description, or may be learned by practice of the disclosure.

According to example embodiments, there may be provided a polyimide varnish composition for a flexible substrate having high heat resistance.

Specifically, the polyimide varnish composition for the flexible substrate according to the present disclosure may produce a polyimide film having reduced coefficient of thermal expansion and improved elongation.

BRIEF DESCRIPTION OF THE DRAWING

These and/or other aspects, features, and advantages of the invention will become apparent and more readily appreciated from the following description of example embodiments, taken in conjunction with the accompanying drawing of which:

FIG. 1 is a flowchart illustrating a method for manufacturing a flexible electronic device according to the present disclosure.

DETAILED DESCRIPTION

Hereinafter, embodiments will be described in detail with reference to the accompanying drawing. However, since various changes may be made to the embodiments, the scope of rights of the patent application is not restricted or limited by these embodiments. It should be understood that all modifications, equivalents and substitutes for the embodiments are included in the scope of the rights.

The terms used in the embodiments are used for the purpose of description only, and should not be construed as an intention to limit the present disclosure. The singular expression includes the plural expression unless the context clearly dictates otherwise. In the present specification, it should be understood that a term such as "comprise", or "have" is intended to designate that a feature, a number, a step, an operation, a component, a part, or a combination thereof described in the specification exists, but it does not preclude the possibility of existence or addition of one or more other features, numbers, steps, operations, components, parts, or combinations thereof.

Unless defined otherwise, all terms used herein, including technical or scientific terms, have the same meaning as those commonly understood by those skilled in the art to which the embodiments belong. Terms such as those defined in a commonly used dictionary should be interpreted as having a meaning consistent with the meaning in the context of the related art, and should not be interpreted in an ideal or excessively formal meaning unless explicitly defined in the present application.

Further, in the description with reference to the accompanying drawing, the same components are assigned the same reference numerals regardless of the reference numerals, and overlapping descriptions thereof will be omitted. In the description of the embodiments, if it is determined that a detailed description of a related known technology may unnecessarily obscure the gist of the embodiments, the detailed description thereof will be omitted.

Further, in describing constituent elements of the embodiments, terms such as first, second, A, B, (a), and (b) may be used. These terms are only for distinguishing the constituent elements from other constituent elements, and essences, orders, sequences, or the like of the corresponding constituent elements are not limited by the terms. When it is described that a constituent element is "linked", "coupled", or "connected" to other constituent elements, the constituent element may be directly linked or connected to the other constituent elements, but it should be understood that another constituent element may also be "linked", "coupled", or "connected" between the respective constituent elements.

Constituent elements included in any one embodiment and constituent elements to including a common function will be described using the same names in other embodiments. Unless otherwise stated, descriptions described in any one embodiment may also be applied to other embodiments, and detailed descriptions will be omitted within the overlapping range.

A polyimide varnish composition for a flexible substrate according to an embodiment of the present disclosure may include: an acid anhydride including 3,3',4,4'-biphenyltetra-carboxylic dianhydride (BPDA) and pyromellitic dianhydride (PMDA); and a diamine.

According to an embodiment, the polyimide varnish composition may include at least one selected from the group consisting of N-methyl-2-pyrrolidone (NMP), dimethylacetamide (DMAc), and dimethylformamide (DMF).

According to an embodiment, BPDA may be expressed according to Chemical Formula 1 below.

[Chemical Formula 1]

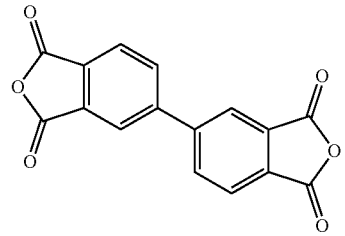

According to an embodiment, PMDA may be expressed according to Chemical Formula 2 below.

[Chemical Formula 2]

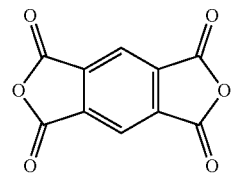

The polyimide varnish composition for the flexible substrate according to the present disclosure may replace glass for a substrate used in conventional flat displays. Unlike the conventional flat displays, it is necessary to change a glass substrate to a more flexible substrate in order to manufacture flexible displays, and polyimide may be used in two layers of a TFT substrate and a base film, and the polyimide varnish composition according to the present disclosure may be used to manufacture the polyimide film.

According to an embodiment, BPDA and PMDA may have a molar ratio of 1:9 to 3:7.

According to an embodiment, the diamine may include p-phenylenediamine (PDA) and 2-(4-aminophenyl)benzoxazole-5-amine (APBOA).

According to an embodiment, the diamine may include at least one diamine selected from the group consisting of compounds represented by Chemical Formulas 3 to 5 below.

[Chemical Formula 3]

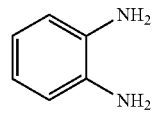

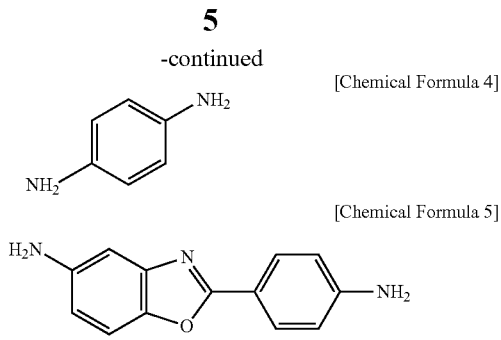

[Chemical Formula 4]

[Chemical Formula 5]

According to an embodiment, PDA and APBOA may have a molar ratio of 7:3 to 9:1.

The polyimide varnish composition for the flexible substrate according to an embodiment may further include an imidazole-based curing catalyst.

According to an embodiment, the curing catalyst may include at least one selected from the group consisting of 2,4,5-triphenylimidazole, 1,2,4,5-tetramethylimidazole, 2-ethyl-4-methylimidazole, 2,4,5-trimethylimidazole, 2-phenyleneimidazole, 4-phenyleneimidazole, 4,5-diphenylimidazole, 1-benzylimidazole, 2-phenylimidazoline, and thiabendazole.

According to an embodiment, the curing catalyst may be contained in an amount of 5 mol % to 50 mol % based on the total mole number of the acid anhydride and diamine.

According to an embodiment, the curing catalyst may have a boiling point of 250° C. or more and a pKa of 6.0 or more.

According to an embodiment, when the curing catalyst has a boiling point of less than 250° C., there may be a problem in that physical properties are deteriorated due to the decomposition of residual materials at a curing temperature of 400° C. or more.

According to an embodiment, when the curing catalyst has an acid dissociation constant (pKa) of less than 6.0, the imidization rate is dropped so that there may be a problem in that the coefficient of thermal expansion (CTE) increases.

The polyimide film according to other embodiments of the present disclosure may be manufactured from the polyimide varnish composition for the flexible substrate according to an embodiment of the present disclosure.

According to an embodiment, the polyimide film may have a coefficient of thermal expansion of 8 ppm/K or less at 50° C. to 450° C., a glass transition temperature of 450° C. or more, a thermal degradation temperature of 550° C. or more, an elastic modulus of 6 GPa or more, a transmittance for light having a wavelength of 550 nm of 65% or more, an elongation at a crosshead speed of 20 mm/min of 15% or more, or an isothermal heat resistance time at 480° C. of 2 hours or more.

According to an embodiment, when the polyimide film has a coefficient of thermal expansion higher than 8 ppm/K, if the process or use temperature is changed, product defects such as crack generation, delamination, and substrate breakage, may occur due to a difference in the coefficient of thermal expansion. Meanwhile, manufacturing processes and uses of a polyimide film and an electronic device including the same are mainly made at 50° C. to 450° C., and the coefficient of thermal expansion referred to in the present disclosure may refer to a coefficient of thermal expansion in a range of 50° C. to 450° C.

According to an embodiment, if the polyimide film has a glass transition temperature (Tg) of 450° C. or more or a thermal degradation temperature (Td) of 550° C. or more, there is an advantage in that the heat resistance of the polyimide film may be secured.

According to an embodiment, the polyimide film may have an elastic modulus of 6 GPa or more. When the polyimide film has an elastic modulus lower than 6 GPa, the film has low rigidity so that there may be a problem in that it is easily broken by external impact.

According to an embodiment, the polyimide film may have an isothermal heat resistance time of 2 hours or more. The isothermal heat resistance time according to the present disclosure may be a value measured at 480° C., and when the polyimide film has an isothermal heat resistance time less than 2 hours, defects may occur in the repetitive panel fabrication process.

According to an embodiment, the polyimide film may have a haze of 1 or less.

A method for manufacturing a flexible electronic device according to still another embodiment of the present disclosure may include the steps of: applying the polyimide varnish composition for the flexible substrate according to an embodiment of the present disclosure onto a carrier substrate; curing the polyimide varnish composition to form a polyimide film; forming an electronic device on the polyimide film; and separating the polyimide film from the carrier substrate.

FIG. 1 is a flowchart illustrating a method for manufacturing a flexible electronic device according to the present disclosure.

Referring to FIG. 1, a method for manufacturing a flexible electronic device according to an aspect of the present disclosure may include a step (S10) of applying a polyimide varnish composition onto a carrier substrate, a step (S20) of curing the polyimide varnish composition to form a polyimide film, and a step (S30) of separating the polyimide film from the carrier substrate.

According to an embodiment, the separation step may be performed by laser irradiation. Hereinafter, the present disclosure will be described in more detail by Examples and Comparative Examples.

However, the following Examples are only for illustrating the present disclosure, and the content of the present disclosure is not limited to the following Examples.

Example 1

A mixed solution was prepared by mixing BPDA and PMDA as an acid anhydride at a molar ratio of 2:8 and mixing PDA and APBOA as a diamine at a molar ratio of 9:1. A polyimide varnish composition was prepared by adding triphenylimidazole (TPI) as a catalyst to the mixed solution so that the amount thereof became 10 mol % based on the total mole number of the acid anhydride and diamine.

Example 2

A polyimide varnish composition was prepared in the same manner as in Example 1 except that PDA and APBOA were mixed so that their molar ratio became 7:3 in Example 1.

Example 3

A polyimide varnish composition was prepared in the same manner as in Example 1 except that triphenylimidazole was added so that the amount thereof became 30 mol % based on the total mole number of the acid anhydride and diamine in Example 1.

Example 4

A polyimide varnish composition was prepared in the same manner as in Example 1 except that triphenylimidazole was added so that the amount thereof became 50 mol % based on the total mole number of the acid anhydride and diamine in Example 1.

Comparative Example 1

A polyimide varnish composition was prepared in the same manner as in Example 1 except that PDA and APBOA were mixed so that their molar ratio became 6:4 in Example 1.

Comparative Example 2

A polyimide varnish composition was prepared in the same manner as in Example 1 except that triphenylimidazole was not added in Example 1.

Comparative Example 3

A polyimide varnish composition was prepared in the same manner as in Example 1 except that APBOA was not included as a diamine in Example 1.

Comparative Example 4

A polyimide varnish composition was prepared in the same manner as in Example 1 except that BPDA and PMDA were mixed so that their molar ratio became 5:5 in Example 1.

Comparative Example 5

A polyimide varnish composition was prepared in the same manner as in Example 1 except that triphenylimidazole was added so that the amount thereof became 60 mol % based on the total mole number of the acid anhydride and diamine in Example 1.

The components of the polyimide varnish compositions according to Examples and Comparative Examples above are shown in Table 1 below.

TABLE 1

| Item | Anhydride | | Molar ratio of anhydride | Diamine | | Molar ratio of diamine | Catalyst | Content |
|---|---|---|---|---|---|---|---|---|
| Example 1 | BPDA | PMDA | 2:8 | PDA | APBOA | 9:1 | TPI | 10 mol % |
| Example 2 | BPDA | PMDA | 2:8 | PDA | APBOA | 7:3 | TPI | 10 mol % |
| Example 3 | BPDA | PMDA | 2:8 | PDA | APBOA | 9:1 | TPI | 30 mol % |
| Example 4 | BPDA | PMDA | 2:8 | PDA | APBOA | 9:1 | TPI | 50 mol % |
| Com. Example 1 | BPDA | PMDA | 2:8 | PDA | APBOA | 6:4 | TPI | 10 mol % |
| Com. Example 2 | BPDA | PMDA | 2:8 | PDA | APBOA | 9:1 | — | — |
| Com. Example 3 | BPDA | PMDA | 2:8 | PDA | — | 10:0 | TPI | 10 mol % |
| Com. Example 4 | BPDA | PMDA | 5:5 | PDA | APBOA | 9:1 | TPI | 10 mol % |
| Com. Example 5 | BPDA | PMDA | 2:8 | PDA | APBOA | 9:1 | TPI | 60 mol % |

The polyimide varnish compositions according to Examples 1 to 4 and Comparative Examples 1 to 5 were spin-coated on a glass substrate. After the glass substrate coated with the polyimide varnish compositions was put into an oven, heated at a rate of 5° C./min, maintained at 120° C. for 20 minutes and 450° C. for 30 minutes in a nitrogen atmosphere, and subjected to a curing process, polyimide films with a thickness of 10 μm were manufactured.

The physical properties of the film according to each composition were measured to be shown in Table 2 below.

TABLE 2

| Item | CTE ppm/KJ | Tg [° C.] | Td [° C.] | Elastic modulus [GPa] | Elongation [%] |
|---|---|---|---|---|---|
| Example 1 | 2.8 | >450 | 567 | 7.2 | 17.2 |
| Example 2 | 4.7 | >450 | 563 | 7.0 | 18.5 |
| Example 3 | 4.6 | >450 | 570 | 7.0 | 22.7 |
| Example 4 | 6.7 | >450 | 561 | 6.8 | 26.3 |
| Com. Example 1 | 6.5 | 425 | 560 | 6.7 | 28.5 |
| Com. Example 2 | 12.5 | 421 | 543 | 7.8 | 10.5 |
| Com. Example 3 | 4.5 | >450 | 561 | 8.2 | 9.3 |
| Com. Example 4 | 8.5 | 436 | 552 | 8.5 | 13.5 |
| Com. Example 5 | 8.2 | 416 | 545 | 6.5 | 19.4 |

Referring to Table 2, it may be confirmed that the polyimide films manufactured from the polyimide varnish compositions according to Examples have excellent physical properties such as thermal expansion coefficient, glass transition temperature, thermal degradation temperature, elastic modulus, and elongation, compared to Comparative Examples.

Although Examples have been described with reference to the limited drawing as described above, those skilled in the art may apply various technical modifications and variations based on the above description. For example, although the described techniques are performed in a different order than the described method, and/or the constituent elements such as the described system, structure, apparatus, and circuit are coupled or combined in a different form than the described method, or replaced or substituted by other constituent elements or equivalents, appropriate results may be accomplished.

Therefore, other embodiments, other examples, and equivalents to the patent claim scope also belong to the scope of the claims to be described later.

What is claimed is:

1. A polyimide varnish composition for a flexible substrate, the polyimide varnish composition comprising: an acid anhydride including 3,3',4,4'-biphenyltetracarboxylic dianhydride (BPDA) and pyromellitic dianhydride (PMDA); a diamine including p-phenylenediamine (PDA) and 2-(4-aminophenyl)benzoxazole-5-amine (APBOA); and an imidazole-based curing catalyst, wherein the BPDA and the PMDA have a molar ratio of 1:9 to 3:7, wherein the PDA and the APBOA have a molar ratio of 7:3 to 9:1, wherein the imidazole-based curing catalyst is contained in an amount of 5 mol % to 50 mol % based on the total mole number of the acid anhydride and diamine, and wherein the imidazole-based curing catalyst has a boiling point of 250° C. or more and a pKa of 6.0 or more.

2. The polyimide varnish composition for the flexible substrate of claim 1, wherein the curing catalyst includes at least one selected from the group consisting of 2,4,5-triphenylimidazole, 1,2,4,5-tetramethylimidazole, 2-ethyl-4-methylimidazole, 2,4,5-trimethylimidazole, 2-phenyleneimidazole, 4-phenyleneimidazole, 4,5-diphenylimidazole, 1-benzylimidazole, 2-phenylimidazoline, and thiabendazole.

* * * * *